United States Patent [19]

Boerema et al.

[11] Patent Number: 5,283,720
[45] Date of Patent: Feb. 1, 1994

[54] VISOR WITH ILLUMINATION

[75] Inventors: Edward T. Boerema, West Olive; Thomas E. Arbisi, Holland, both of Mich.

[73] Assignee: Prince Corporation, Holland, Mich.

[21] Appl. No.: 904,709

[22] Filed: Jun. 26, 1992

[51] Int. Cl.$^5$ .............................................. F21V 33/00
[52] U.S. Cl. ..................... 362/83.3; 362/74; 362/135; 362/294
[58] Field of Search ............... 362/74, 83.3, 135, 140, 362/141, 142, 144, 294; 296/97.1, 97.2, 97.3

[56] References Cited

U.S. PATENT DOCUMENTS

| 678,538 | 9/1952 | Marks | 362/74 |
| 2,268,189 | 12/1941 | Colbert | 362/140 |
| 3,211,903 | 10/1965 | McElreath | 362/141 |
| 4,421,355 | 12/1983 | Marcus | 362/144 |
| 4,511,954 | 4/1985 | Marcus et al. | 362/144 |
| 4,794,497 | 12/1988 | Jönsas et al. | 362/141 |
| 5,130,906 | 7/1992 | Lund | 362/74 |

FOREIGN PATENT DOCUMENTS

| 337251 | 10/1989 | European Pat. Off. | 296/97.2 |
| 3711570 | 10/1988 | Fed. Rep. of Germany | 362/74 |

Primary Examiner—Richard R. Cole
Assistant Examiner—Y. Quach
Attorney, Agent, or Firm—Price, Heneveld, Cooper, DeWitt and Litton

[57] ABSTRACT

A visor includes an integral, focussed and recessed lamp assembly positioned at a corner of the visor and inclined and directed away from the driver's eyes to provide courtesy and map illumination with a minimal of distraction to the driver. The visor provides directable illumination for use as a maplamp or floorlamp by movement of the visor position.

4 Claims, 2 Drawing Sheets

VISOR WITH ILLUMINATION

BACKGROUND OF THE INVENTION

The present invention pertains to automotive visors and particularly to a visor with an integrated light.

There exists a wide variety of vehicle illumination systems for providing map reading and courtesy illumination of the interior of a vehicle. An early visor design which includes a center mount which is somewhat large and bulky light and a separate switch such as disclosed in U.S. Pat. No. 2,641,684 issued Jun. 9, 1953, to V. J. Dillon.

Frequently, visors include map reading lamps which perform the dual function of providing illumination for a vanity mirror and that of a map reading lamp. U.S. Pat. No. 4,227,241 issued Oct. 7, 1980, to Marous, discloses such a visor.

Although such visors provide adequate illumination for use as maplamps, they tend to provide either too much illumination, as is the case of the Dillon patent, which can be distracting to the driver of the vehicle or the illumination is somewhat compromised between providing facial illumination for use of a vanity mirror and lap illumination for reading items such as a map. Accordingly, there remains a need for directable illumination which can be achieved by providing illumination on a visor and one which provides an optimal positioning and intensity of illumination for use as a courtesy light or directable for use as a maplamp or other directable illumination as desired without interfering with the vision of the driver.

SUMMARY OF THE PRESENT INVENTION

The visor and lamp assembly of the present invention accomplishes these goals by providing a visor having an integral, focussed and recessed lamp assembly positioned at a corner of the visor and inclined and directed away from the driver's eyes to provide courtesy and map illumination with a minimal of distraction to the driver. The visor provides directable illumination for use as a maplamp or floorlamp by movement of the visor position. Visors embodying one embodiment of the present invention include a visor body having a recess formed therein for receiving a lamp assembly, and a lamp assembly mounted to the visor body within the recess. The recess is preferably located near a corner of the visor positioned toward the center of a vehicle when the visor is in its stored position adjacent the vehicle headliner.

The lamp assembly includes a housing having a lens mounted in recessed relationship to an outer surface of the housing facing the interior of the vehicle and lamp means mounted to the housing behind the lens means. In a preferred embodiment of the invention, the lamp means is a cartridge lamp mounted at an inclined angle with respect to the plane of the visor body as is the lens to provide a compact assembly. In one preferred embodiment, illumination is directed by the use of a reflector mounted behind the lamp. Such an arrangement provides for optimal selectivity for spotlighting of the lap or floor area of a vehicle which can be selectively directed by movement of the visor. The illumination also serves as a courtesy lamp when the visor is stored adjacent the vehicle headliner. These and other features, objects and advantages of the present invention will become apparent upon reading the following description thereof together with reference to the accompanying drawings in which:

DETAILED DESCRIPTION OF THE PREFERRED EMBODIMENT

Figure 1:
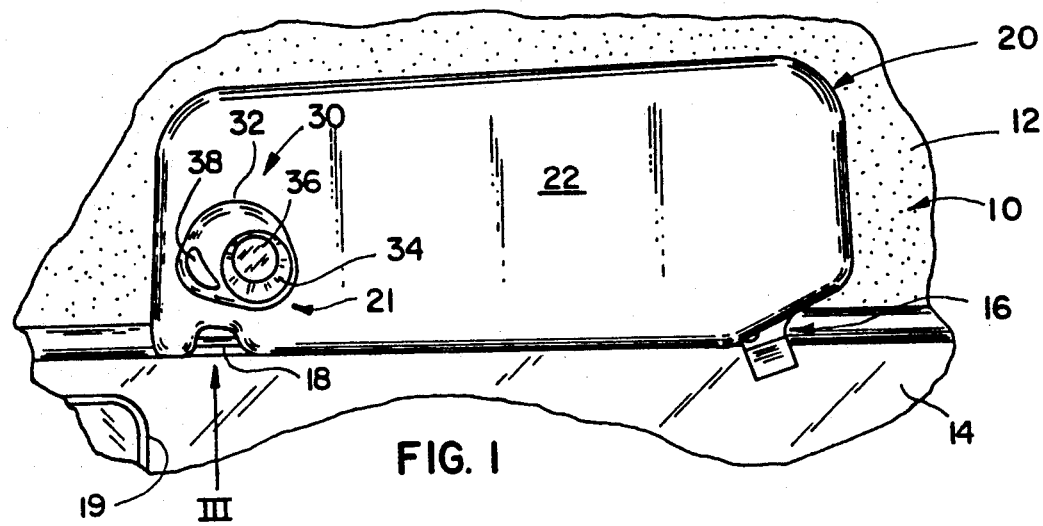
FIG. 1 is a perspective view of the interior of a vehicle showing a passenger side visor embodying the system of the present invention.
Figure 2:
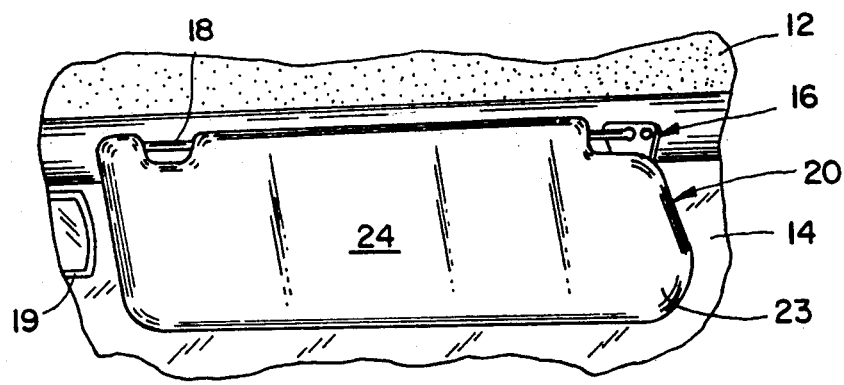
FIG. 2 is a perspective view of the structure shown in FIG. 1 with the visor shown in a lowered sunblocking position.

Referring initially to FIGS. 1 and 2, there is shown a portion of the interior of a vehicle 10 such as an automobile and a visor assembly 20 mounted to the passenger side of the vehicle. The visor is shown in a stored position in FIG. 1 raised against the vehicle headliner 12 and in a lowered sunblocking position covering the upper edge of the vehicle windshield 14 in FIG. 2. The visor is mounted to the roof of the vehicle by means of a pivot arm mounting assembly 16 which allows movement of the visor between a raised stored position shown in FIG. 1, selected lowered use, and a sunblocking position as shown in FIG. 2. Assembly 16 may be of the type shown in U.S. Pat. No. 4,500,131, the disclosure of which is incorporated herein by reference. Assembly 16 also allows the visor to pivot to the side for side window protection when in a lowered position. An auxiliary visor clip 18 is provided near the end of the visor remote from pivot rod assembly 16 for providing support of the opposite end of the visor which is toward the center of the vehicle near the rearview mirror assembly 19.

The visor assembly 20 includes a first inner facing surface 22 which faces the inside of the vehicle when in a raised stored position as shown in FIG. 1 and an opposite surface 24 which faces inwardly when the visor is rotated downwardly into a sunblocking position as shown in FIG. 2. The visor assembly includes a visor core 26 defining the visor body shape which is covered by an upholstery material 23 to conform the visor appearance to that of the interior of the vehicle. Core 26 can be of any suitable construction such as a molded polymeric core, a foam core, or can be made of fiberboard, all constructions of which are in common commercial use. Mounted within a recess 27 (FIG. 4) formed in the corner 21 of the visor core 26 is a lamp assembly 30 embodying the present invention. Lamp assembly 30 is mounted to the corner area 21 of visor assembly 20 which is immediately adjacent support post 18 and toward the centerline of the vehicle immediately adjacent the rearview mirror assembly 19 (FIGS. 1 and 2).

Figure 3:
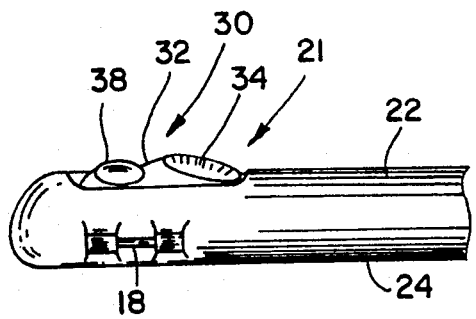
FIG. 3 is a fragmentary, enlarged, edge elevational view of a portion of the visor structure shown in FIG. 1 taken in a direction indicated by Arrow III in FIG. 1.
Figure 6:
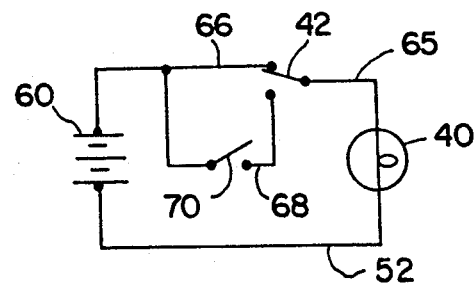
FIG. 6 is an electrical circuit diagram in schematic form of the lamp assembly and its connection to the vehicle's electrical system.
Figure 4:
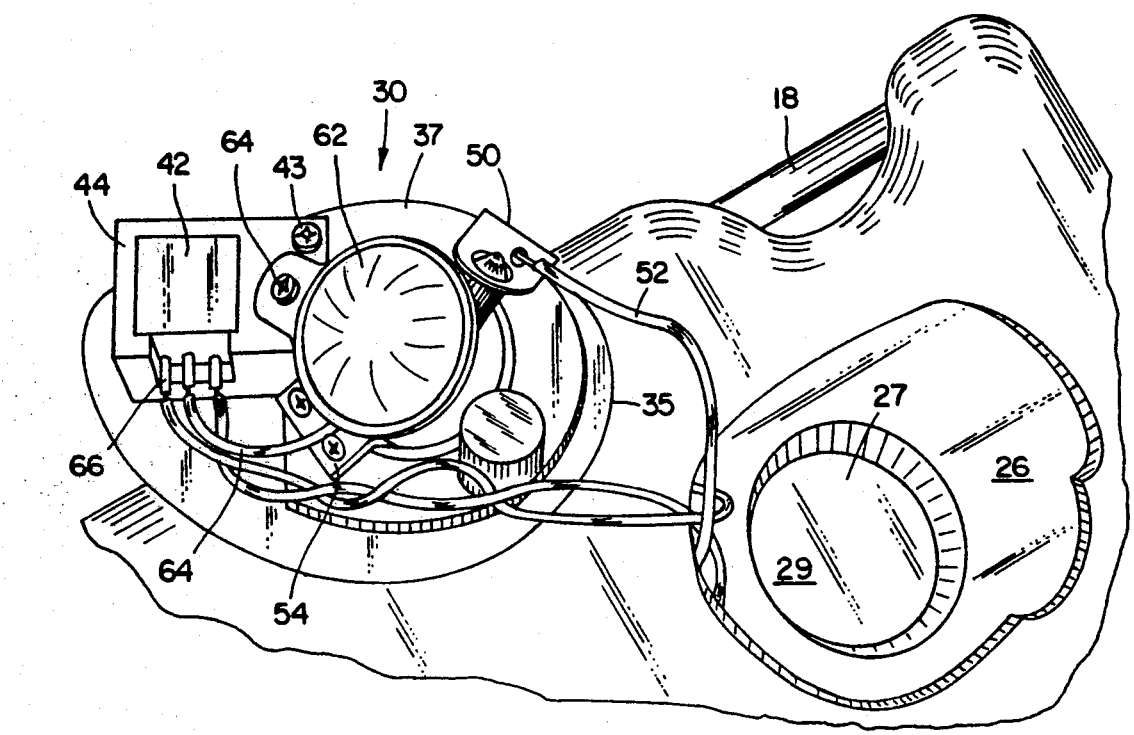
FIG. 4 is an enlarged, fragmentary, exploded view of the corner of the visor shown in FIG. 1 shown with the lamp assembly removed and inverted to show the lamp assembly in plan view.
Figure 5:
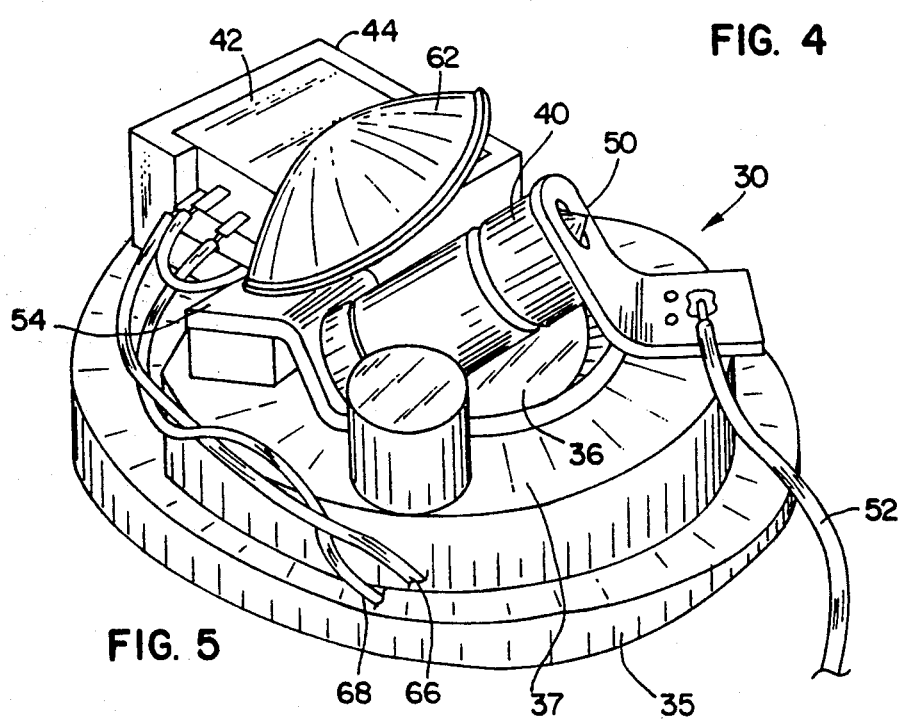
FIG. 5 is a fragmentary, perspective view of the lamp assembly shown in FIG. 4.

The lamp assembly 30 includes a housing 32 with a teardrop-shaped bezel defining the outer decorative surface, as best seen in FIG. 1. Housing 32 includes a deeply recessed, angled circular opening 34 for receiving a recessed lens 36 therein. Adjacent the lens 36, which focuses light from a lamp 40 away from the center of the vehicle and toward the center of the passenger area of the vehicle, is a crescent shaped push-button actuator 38 which is coupled to a two-pole, push-button switch 42 (FIGS. 4-6). The construction of the lamp assembly and the mounting of the components therein, as best seen in FIGS. 4 and 5, which show the reverse side of the housing 32 and the mounting of switch 42 at one end of the housing. The housing includes a peripheral trim ring 35 and an upstanding mounting ring 37 (FIGS. 4 and 5) which snap fits within aperture 27 in visor core 26. As seen in FIGS. 1, 3 and 5, the lens 36 is mounted at an angle inclined to the plane of the peripheral trim ring 35 of housing 32. Positioned immediately behind lens 36 is lamp 40 which is a cartridge-type commercially available 100 lumen 6 c.p. lamp commonly used in vehicle interior lighting and having one end mounted to a receiving contact clip 50 which in turn is coupled to the vehicle's electrical supply by means of a ground conductor 52 shown schematically, also in FIG. 6, which illustrates the vehicle power supply as the vehicle battery 60. The end of lamp 40 opposite contact 50 is coupled to a second contact 54 which, as best seen in FIG. 5, is vertically closer to trim ring 35 than contact 50 so as to mount bulb 40 at an angle inclined the same plane as lens 36 or at an angle, as best seen in FIG. 3, of about 30°.

Mounted to ring 37 of the housing is a switch housing 44 which securely holds a snap action double-pole, double-throw switch 42 therein and also serves to support one end of a reflector 62 positioned behind bulb 40 and mounted to housing 44 by means of a suitable fastener such as a screw 64. Housing 44 can be mounted to the housing ring 37 by means of one or more fastening screws 43 or preferably integrally molded therewith of a suitable polymeric material such as polycarbonate. Switch 42 includes three conductors, with the center conductor 65 leading to lamp contact 54. A second conductor 66 is coupled directly to the vehicle battery 60 as seen in FIG. 6, while the third conductor 68 is coupled to a vehicle courtesy light switch 70 such that the lamp assembly 30 can be used either as a courtesy light activated by the opening of a vehicle door which closes switch 70 (FIG. 6) or by actuating switch 42 into the position shown in FIG. 6 which activates the bulb and provides illumination regardless of the position of the courtesy light control switch 70.

The visor core 26 may include a heat dissipative surface 29 (FIG. 4) such as a foil sheet which is positioned over the floor of recess 27 immediately adjacent the opposite surface 24 of the visor to provide heat dissipation and sufficient room for the lamp assembly. By providing a teardrop-shaped housing with a deeply recessed angled circular opening 34 for the lens 36, which is a plano-convex lens having a focal length of 40 mm., illumination from lamp 40 is focused into a spot configuration. Illumination is also directed away from the driver's eyes by mounting the housing at the selected corner 21 of the visor immediately adjacent the rearview mirror assembly 19. With the lamp and lens inclined toward the interior, the illumination is directed toward the passenger side of the vehicle and will not interfere with the vehicle operator.

When in a raised stored position, as shown in FIG. 1, the visor assembly 20 provides courtesy illumination for the interior of the vehicle. However, the visor 20 can be lowered from the stored position, shown in FIG. 1, to an intermediate position rotated downwardly away from the headliner 12 any desired amount and held in such position by a torque fitting such as that disclosed in U.S. Pat. No. 4,500,112, such that the illumination from lamp 40 can be directed toward the lap area or even the floor of the vehicle if the passenger is looking for a dropped item. In all of these positions, the illumination is generally directed away from the driver's eyes since it is directed by a lens from a position inclined away from the driver.

The compact shape of the housing 32 allows for the integration of the switch push button 38, which is coupled to the switch 42 in a conventional fashion, and the mounting of the lens in a compact design which will fit in today's relatively thin visor constructions and yet provide a directable light which is not offensive to the driver in low ambient light conditions. The light is directable to a plurality of usable positions for the vehicle passenger. It will become apparent to those skilled in the art that various modifications to the preferred embodiment of the present invention can be made without departing from the spirit or scope thereof as defined by the appended claims.

The embodiments of the invention in which an exclusive property or privilege is claimed are defined as follows:

1. A visor for use with a vehicle having an interior with a headliner, a driver seat, a passenger seat, and a central area between said driver seat and passenger set, said visor including means for illuminating the interior of a vehicle comprising:

a visor body generally extending along a plane and means for mounting said visor body to a vehicle for movement between a raised position adjacent the vehicle headliner and a lowered sunblocking position, said visor body including a recess formed din a corner of said visor body located toward the central area of the vehicle and formed in a side of the visor facing inwardly toward the interior of the vehicle when said visor body is in said raised position;

illumination means including lamp means mounted in said recess for directing illumination form said visor body, wherein said illumination means includes a housing including a housing recess inclined to said plane along which said visor body extends and lamp means mounted to said housing to direct illumination through said housing recess at an angle directed sway from the central area of the vehicle, and wherein said illumination means further includes lens means mounted to said housing recess for focusing light from said lamp means which is mounted to said housing in a plane parallel to said lens means;

switch means mounted to said housing an coupled to said lamp means for selectively applying power to said lamp means; and reflector means mounted to said housing and extending behind said lamp means for reflecting illumination from said lamp means toward said lens means and further including heat dissipative means mounted to a floor of said recess of said visor.

2. A visor assembly for a vehicle having a headliner, a driver seat, a passenger seat, and a central area between said river seat and passenger seat comprising:

a visor body and means for mounting said visor body to a vehicle for movement between a raised position adjacent the headliner of the vehicle to a plurality of lowered positions;

a lamp housing mounted to said visor body and including an inclined recess having lens means mounted therein and a lamp positioned behind said lens means for directing illumination away from said visor toward the center of a vehicle seat aligned with said visor body, wherein said visor body includes a recess formed therein for receiving said lamp housing, said recess located in said visor body at a corner adjacent the central area of the vehicle at a lower end of said visor body when said visor body is in said raised position, and wherein said housing integrally includes a bezel, a switch actuating button positioned on said bezel adjacent said inclined recess, and switch means actuated by said switch actuating button and coupled to said lamp for selectively applying operating power to said lamp.

3. The visor assembly as defined in claim 2 and further including a convex reflector mounted to said housing to extend behind said lamp for directing illumination outwardly from said lens means.

4. A visor for use with a vehicle having an interior with a headliner, a driver seat, a passenger seat, and a central area located between said driver seat and passenger seat, said visor including means for illuminating the interior of a vehicle comprising:

a visor body generally extending along a plane and means for mounting said visor body to a vehicle for movement between a raised position adjacent the vehicle headliner and a plurality of lowered positions;

illumination means including lamp means mounted to said visor body at a corner of said visor body located toward the center of the vehicle and on a side of the visor facing inwardly toward the interior of the vehicle when said visor body is in sad raised position for directing illumination form said visor body wherein said illumination means includes a housing including a housing recess inclined to said plane along which said visor body extends and lamp means mounted to said housing to direct illumination through said housing recess at an angle directed away from the central area of the vehicle, wherein said illumination means further includes lens means, mounted to said housing recess for focusing light from said lamp means which is mounted to said housing in a plane parallel to said lens means, and wherein said illumination means further includes switch means mounted to said housing and coupled to said lamp means for selectively applying power to said lamp means; and reflector means mounted to said housing and extending behind said lamp means for reflecting illumination from said lamp means toward said lens means, wherein said visor body includes a recess formed therein for receiving said housing, and further including heat dissipative means mounted to a floor of said recess of said visor body.

* * * * *

UNITED STATES PATENT AND TRADEMARK OFFICE
CERTIFICATE OF CORRECTION

PATENT NO. : 5,283,720
DATED : February 1, 1994
INVENTOR(S) : Edward T. Boerema et al.

It is certified that error appears in the above-indentified patent and that said Letters Patent is hereby corrected as shown below:

Column 1, line 18:
    "Marous" should be --Marcus--.

Column 4, claim 1, line 32:
    "set" should be --seat--.

Column 4, claim 1, line 39:
    "din" should be --in--.

Column 4, claim 1, line 46:
    "form" should be --from--.

Column 4, claim 1, line 52:
    "sway" should be --away--.

Column 4, claim 1, line 58:
    "an" should be --and--.

Column 4, claim 2, line 68:
    "river" should be --driver--.

UNITED STATES PATENT AND TRADEMARK OFFICE
CERTIFICATE OF CORRECTION

PATENT NO. : 5,283,720                           Page 2 of 2
DATED     : February 1, 1994
INVENTOR(S) : Edward T. Boerema et al.

It is certified that error appears in the above-indentified patent and that said Letters Patent is hereby corrected as shown below:

Column 6, claim 4, line 8:
    "sad" should be --said--.

Column 6, claim 4, line 9:
    "form" should be --from--.

Signed and Sealed this

Sixth Day of September, 1994

Attest:

BRUCE LEHMAN

*Attesting Officer*      *Commissioner of Patents and Trademarks*